US010656070B2

(12) United States Patent
Hayden et al.

(10) Patent No.: US 10,656,070 B2
(45) Date of Patent: May 19, 2020

(54) ALIGNING A NON-SPHERICAL BIOLOGICAL ENTITY IN A SAMPLE FLOW USING AMBIENT VISCOELASTIC FLUID FLOWS

(71) Applicant: Siemens Healthcare GmbH, Erlangen (DE)

(72) Inventors: Oliver Hayden, Moosburg (DE); Lukas Richter, Hirschaid (DE); Matthias Ugele, Neumarkt (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/090,205

(22) PCT Filed: Mar. 30, 2016

(86) PCT No.: PCT/EP2016/056955
§ 371 (c)(1),
(2) Date: Sep. 28, 2018

(87) PCT Pub. No.: WO2017/167361
PCT Pub. Date: Oct. 5, 2017

(65) Prior Publication Data
US 2019/0113433 A1    Apr. 18, 2019

(51) Int. Cl.
*G01N 15/14*    (2006.01)
*B01L 3/00*    (2006.01)
(Continued)

(52) U.S. Cl.
CPC .... *G01N 15/1404* (2013.01); *B01L 3/502776* (2013.01); *G01N 15/1434* (2013.01);
(Continued)

(58) Field of Classification Search
CPC ....... B01L 2200/0636; B01L 3/502776; G01N 15/147; G01N 15/404; G01N 15/1459;
(Continued)

(56) References Cited

U.S. PATENT DOCUMENTS 7,997,831 B2 *    8/2011  Gilbert ................ B01F 13/0064
                                                                406/198
2007/0036678 A1    2/2007  Sundararajan et al.
(Continued)

FOREIGN PATENT DOCUMENTS

WO    WO 01/48455 A2    7/2001
WO    WO 2009/128938    10/2009

OTHER PUBLICATIONS

International Search Report and Written Opinion of International Application No. PCT/EP2016/056955 dated Dec. 19, 2016.
(Continued)

*Primary Examiner* — Hoa Q Pham
(74) *Attorney, Agent, or Firm* — Dugan & Dugan, PC

(57) ABSTRACT

A technique is presented for aligning, in a desired region within a flow chamber of a flow cell, a non-spherical biological entity carried in a sample. The flow chamber has a rectangular cross-section. A bottom flow input module, a top flow input module and a sample input module provide a viscoelastic first fluid, a second viscoelastic fluid, and the sample, respectively, to the flow chamber. The first and the second viscoelastic fluids laminarly flow along a bottom and a top wall of the flow chamber and the sample laminarly flows sandwiched between them. By controlling rate of flow of the first and/or the second viscoelastic fluids the sample flow, and thus the non-spherical biological entity, is focused in the desired region. A gradient of sheer within the sample
(Continued)

flow set up due to the first and second viscoelastic fluids orients the non-spherical biological entity in the desired region.

15 Claims, 5 Drawing Sheets

(51) Int. Cl.
*G01N 21/45* (2006.01)
*G01N 15/10* (2006.01)
*G01N 15/00* (2006.01)

(52) U.S. Cl.
CPC .... *G01N 21/453* (2013.01); *B01L 2200/0663* (2013.01); *G01N 15/147* (2013.01); *G01N 15/1484* (2013.01); *G01N 2015/0073* (2013.01); *G01N 2015/0084* (2013.01); *G01N 2015/1006* (2013.01); *G01N 2015/1409* (2013.01); *G01N 2015/1411* (2013.01); *G01N 2015/1413* (2013.01); *G01N 2015/1415* (2013.01); *G01N 2015/1452* (2013.01); *G01N 2015/1497* (2013.01)

(58) Field of Classification Search
CPC ....... G01N 15/1484; G01N 2015/1413; G01N 2015/1409; G01N 2015/1411; G01N 2015/1415
USPC ........ 356/335–343, 73; 422/400, 68.1, 82.05
See application file for complete search history.

(56) References Cited

U.S. PATENT DOCUMENTS

2011/0008767 A1 1/2011 Durack
2013/0171685 A1* 7/2013 Schutze ............. G01N 15/1468 435/34
2013/0233420 A1* 9/2013 Di Carlo ............ G01N 15/1404 137/565.01
2014/0147860 A1 5/2014 Kaduchak et al.
2014/0273067 A1* 9/2014 Wanders .................. G01N 1/30 435/29
2014/0315238 A1* 10/2014 Farrell ............... G01N 15/1404 435/29
2015/0114093 A1 4/2015 Appleyard et al.
2015/0247789 A1* 9/2015 Kaduchak .......... G01N 15/1434 356/440
2015/0362413 A1* 12/2015 Zhang .................... B01D 21/00 210/801
2016/0041083 A1 2/2016 Wanders et al.

OTHER PUBLICATIONS

Office Action of U.S. Appl. No. 16/065,789, dated Oct. 10, 2019.
Final Office Action of U.S. Appl. No. 16/065,789, dated Jan. 28, 2020.

* cited by examiner

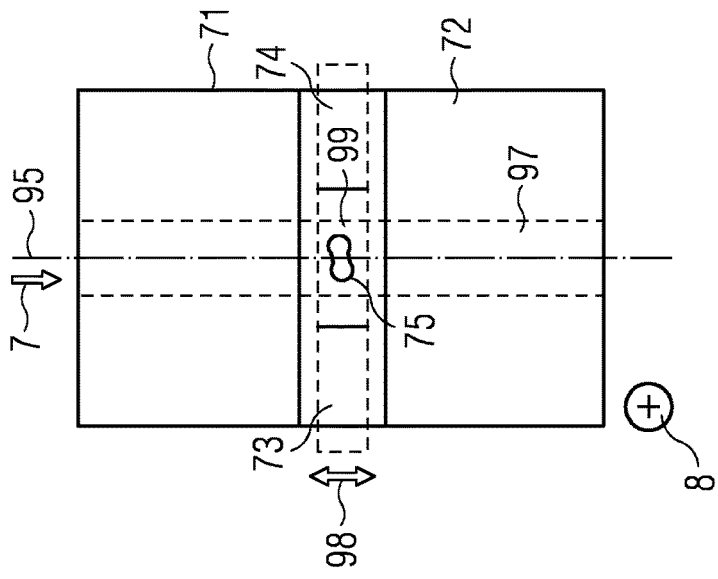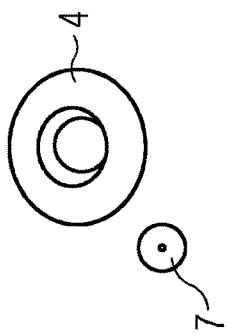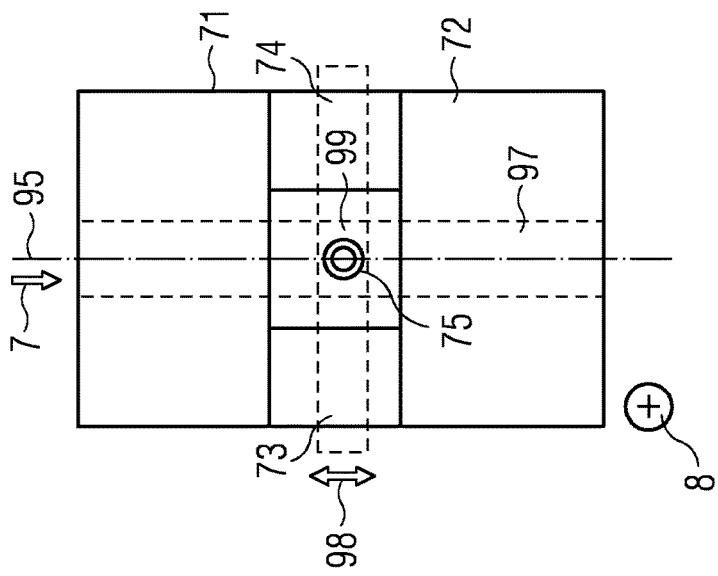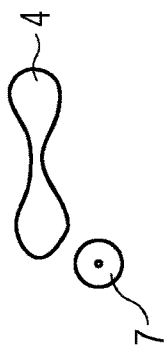

ALIGNING A NON-SPHERICAL BIOLOGICAL ENTITY IN A SAMPLE FLOW USING AMBIENT VISCOELASTIC FLUID FLOWS

CROSS REFERENCE TO RELATED APPLICATION

This is a 371 of PCT/EP2016/056955, filed Mar. 30, 2016, which is hereby incorporated by reference herein in its entirety for all purposes.

FIELD

The present invention relates to techniques for aligning a non-spherical biological entity flowing in a sample that is to be inspected by an imaging device.

BACKGROUND

Medical technology in recent times has witnessed advent of numerous medical devices and microscopy techniques. A lot of these microscopy techniques are used for imaging microscopic specimens or samples for analyzing one or more characteristics of the sample, or more precisely for determining one or more characteristics of a component, for example, red blood cell (RBC), in the sample, for example, blood sample. Examples of characteristics of the component, say RBC, that may be determined may include a volumetric measurement of the RBC, a morphological study of the RBC, and so on and so forth. In general for any imaging dependent analysis, an 'in-focus' image or output from the imaging device is essential for carrying out specific and detailed analysis of the component of the sample. Furthermore, when the component of the sample is a non-spherical entity an orientation of the non-spherical entity with respect to the imaging device, i.e., with respect to an imaging direction, is also essential, for example, an image of the RBC standing on its side is an undesired orientation as in such orientation only sides of RBC are visible. However, with respect to the imaging direction, an image of the RBC oriented such that a full face or one side of the disc shape is visible is a desired orientation as in such orientation images will reveal lot more information which is essential for volumetric or morphological study of the RBC.

For example, a non-spherical biological entity, hereinafter also referred to as the entity, carried in a sample may be studied or inspected by detecting and analyzing interference patterns formed in interferometric microscopy, for example, digital holographic microscopy (DHM). However, throughput of an DHM device or any other imaging device, i.e., rate of number of images or interference patterns provided by the device, is highly dependent on providing the sample to a field of view, hereinafter the FOV, of the imaging device, as the sample should be provided with in depth of field at a focus of the device to obtain 'in-focus' or sharp images or interference patterns as output of the imaging device. Providing the entity in the sample as flowing in a flow cell, for example, similar to the way a sample is provided in flow cytometry, is an efficient way of providing the sample to the imaging device. It has several advantages, for example, it is easier to maintain the entity of the sample, for example, RBCs in the blood, in their native morphology in a fluid flow as compared to placing the entity on a slide. Furthermore, by providing the sample in a flow, the sample, and thus the entities in the sample, may be provided continuously for a time period of imaging and thus a larger amount of sample, i.e., a larger number of the entities, may be imaged which is beneficial for statistical means as compared to scanning or imaging a smaller amount of the sample.

However, providing the sample as flowing in a flow cell has also certain disadvantages. One disadvantage is focusing of the sample in the flow cell. The entities in the sample, for example, RBCs in a diluted or whole blood sample, flowing through the flow cell migrate to different sections of the flow cell and are not arranged in a desired region of the flow cell. Some of the entities while flowing in the flow cell migrate to the walls of the flow cell and contact between the entities with the wall results into surface adhesion of the entities on the flow cell walls, or entities start disintegrating to form debris. Furthermore, since the entities flow to different sections of the flow cell, some of the entities of the sample in the flow cell may be either completely out of the FOV or may be in the FOV but out of focus. The entities of the sample that are completely out of the FOV are not represented in the image of the interference pattern. The entities of the sample that are in the FOV but not in focus are imaged but parts or segments of the image or the interference pattern that represent such entities lack sharpness, i.e., are out of focus or to say that the sharpness of segments of the interference pattern or the image representing such entities are either low or not of acceptable quality or blurred.

Such entities flowing as part of the sample in the flow cell or flow channel may be brought in focus by readjusting the focus of the interferometric microscopic device or the imaging device, but the entities of the flowing samples are dynamic so there is no time to adjust the focus of the imaging device. Another approach may be to provide the sample in such a way in the flow cell that the sample flows within a desired region of the flow cell, and then the imaging device can be statically focused at the desired region with the depth of field of the imaging device aligned with the desired region and subsequently in-focus imaging of the entities of the sample may be achieved. However, it is a challenge to control the flow of sample in such flow cells, more particularly to control the entities of the sample in the flow cell, so that the samples, or the entities of the sample, are positioned or focused in a desired region of the flow cell. Furthermore, the non-spherical biological entities are also required to be oriented in a desired orientation in the desired region. Thus, the need is to focus and to orient one or more entities in the desired region, in short there is a need of aligning the non-spherical biological entity in the desired region.

SUMMARY

Thus the object of the present disclosure is to provide a technique for aligning a non-spherical biological entity carried in a sample into a desired region in a flow cell.

The above object is achieved by a flow cell for aligning a non-spherical biological entity carried in a sample into a desired region in the flow cell according to claim 1, a method for aligning a non-spherical biological entity carried in a sample into a desired region in a flow cell according to claim 5, and a system for aligning a non-spherical biological entity carried in a sample into a desired region according to claim 13. Advantageous embodiments of the present technique are provided in dependent claims.

A first aspect of the present technique presents a flow cell for aligning a non-spherical biological entity carried in a sample into a desired region in the flow cell. The aligning of the non-spherical biological entity in the desired region is achieved by focusing and orienting the non-spherical biological entity in the desired region. The non-spherical biological entity is to be inspected by an imaging device. The flow cell includes a flow chamber, a bottom flow input module, a top flow input module, a sample input module and an acoustic transducer. The flow chamber has a rectangular cross-section, a top wall, a bottom wall opposite to the top wall, a first side wall, a second side wall opposite to the first side wall and the desired region. The rectangular cross-section includes a square cross-section.

The bottom flow input module receives a first viscoelastic fluid and provides the first viscoelastic fluid to the flow chamber such that the first viscoelastic fluid laminarly flows in the flow chamber in the form of a bottom laminar flow along the bottom wall from one end of the flow chamber towards another end of the flow chamber. The bottom flow input module controls a rate of flow of the first viscoelastic fluid, hereinafter also referred to as the first fluid, in the flow chamber. The top flow input module receives a second viscoelastic fluid and provides the second viscoelastic fluid to the flow chamber such that the second viscoelastic fluid laminarly flows in the flow chamber in the form of a top laminar flow along the top wall from one end of the flow chamber towards another end of the flow chamber. The top flow input module controls a rate of flow of the second viscoelastic fluid, hereinafter also referred to as the second fluid, in the flow chamber.

The sample input module receives the sample and provides the sample to the flow chamber such that the sample laminarly flows in the flow chamber in the form of a sample laminar flow from one end of the flow chamber towards another end of the flow chamber. The sample laminar flow is sandwiched between the top laminar flow and the bottom laminar flow.

Hereinafter, the 'rate of flow' has also been referred to as the flow rate. In the flow cell, by defining or by increasing or by decreasing the flow rate of the first fluid, a height of the bottom laminar flow is controlled or varied. Similarly, by defining or by increasing or by decreasing the flow rate of the second fluid, a height of the top laminar flow is controlled or varied.

In the present technique, 'width' or 'height' have been interchangeably used for any laminar flow, not including the sample laminar flow, and mean an extension of that laminar flow along the rectangular cross-section of the flow chamber from a wall of the flow chamber along which the laminar flow is aligned towards the opposite wall, for example, 'width' or 'height' of the bottom laminar flow means an extension of the bottom laminar flow along the rectangular cross-section of the flow chamber from the bottom wall of the flow chamber towards the top wall of the flow chamber. Similarly 'width' or 'height' of the top laminar flow means an extension of the top laminar flow along the rectangular cross-section of the flow chamber from the top wall of the flow chamber towards the bottom wall of the flow chamber.

For the sample laminar flow, width means an extension of the sample laminar flow along the rectangular cross-section of the flow chamber between the first and the second side walls. For the sample laminar flow, height means an extension of the sample laminar flow along the rectangular cross-section of the flow chamber between the top and the bottom walls or in other words an extension of the sample laminar flow between the top laminar flow and the bottom laminar flow. For the sample laminar flow, 'lateral position' means a location of a cross-section of the sample laminar flow along the rectangular cross-section of the flow chamber between the first and the second side walls, and 'longitudinal position' means a location of the cross-section of the sample laminar flow along the rectangular cross-section of the flow chamber between the top and the bottom walls.

In the flow cell, by controlling or varying the height of the bottom laminar flow and/or the top laminar flow, the width and/or the height and/or the longitudinal position of the sample laminar flow is controlled or varied. By defining the width and/or the height and/or the longitudinal position of the sample laminar flow, the sample laminar flow is focused, i.e., moved into or positioned into the desired region of the flow cell by moving the sample laminar flow between the desired region and the top and/or the bottom walls. Since the non-spherical biological entities are carried in the sample or more particularly in the sample laminar flow, the focusing of the sample laminar flow in the desired region results into focusing of the non-spherical biological entity or entities in the desired region.

Since the top and the bottom laminar flows are viscoelastic in nature, the sample laminar flow and thus the non-spherical biological entity in the sample laminar flow experiences a shear stress resulting from ambient viscosity from the viscoelastic fluids flowing as top and the bottom laminar flows. The shear experiences by the non-spherical biological entity is greater at a boundary between the sample laminar flow and the top laminar flow and between the sample laminar flow and the bottom laminar flow compared to an inside or center of the sample laminar flow. In other words the shear experienced by the non-spherical biological entity decreases at different levels of the sample laminar flow along the height of the sample laminar flow. More specifically the shear experienced by the non-spherical biological entity along the height of the sample laminar flow decreases from the boundary between the sample laminar flow and the top laminar flow and to the center of the sample laminar flow, and similarly the shear experienced by the non-spherical biological entity along the height of the sample laminar flow decreases from the boundary between the sample laminar flow and the bottom laminar flow and to the center of the sample laminar flow. As a result of the difference in the shear acting on the non-spherical biological entity, the non-spherical biological entity aligns itself within the sample laminar flow such that to experience the minimum possible sum of the shear, that is, the non-spherical biological entity gets streamlined with respect to the shear experienced by it from the top and the bottom laminar flows. Thus, the non-spherical biological entity is oriented in the sample laminar flow such that maximum surface area of the non-spherical biological entity is as far as possible from both the top and the bottom laminar flow, for example, in case when the non-spherical biological entity is an erythrocyte, the erythrocyte is oriented such that the disc of the erythrocyte is substantially parallel to the top and the bottom laminar flow and thus the erythrocyte presents a maximum surface area to the imaging device.

In an embodiment of the flow cell, the bottom flow input module and/or the top flow input module are configured to control the rate of flow of the first viscoelastic fluid and/or the second viscoelastic fluid, respectively, such that within the flow chamber a distance between the bottom laminar flow and the top laminar flow is equal to or less than 10 microns, i.e., the height of the sample laminar flow is less than or equal to 10 microns. In general the height of the sample laminar flow may be between 1 micron and 20 microns. Preferably, the distance between the bottom laminar flow and the top laminar flow is between 6 microns and 8.5 microns and thus the when the non-spherical biological entity is erythrocyte, the erythrocytes get oriented such that their disks are parallel to the top and bottom laminar flows.

Furthermore, when the non-spherical biological entity is an irregularly shaped leukocyte, then the irregularly shaped leukocyte is oriented such that it presents a maximum surface area parallel to the top and the bottom laminar flows. In another exemplary embodiment, the height of the sample laminar flow is less than or equal to 4 microns, and in this embodiment, if the non-spherical biological entity is a platelet in addition to erythrocyte, the platelets along with the erythrocytes get oriented to present their maximum surface area parallel to the top and the bottom laminar flows.

In another embodiment of the flow cell, the flow cell includes a first side flow input module. The first side flow input module receives a first side viscoelastic fluid and provides the first side viscoelastic fluid to the flow chamber such that the first side viscoelastic fluid laminarly flows in the flow chamber in the form of a first side laminar flow moving from the one end of the flow chamber towards the another end of the flow chamber. The first side laminar flow is sandwiched between the top laminar flow and the bottom laminar flow and between the first side wall and the sample laminar flow. The first side flow input module controls a rate of flow of the first side viscoelastic fluid, hereinafter also referred to as the first side fluid, in the flow chamber. Furthermore, the flow cell includes a second side flow input module. The second side flow input module receives a second side viscoelastic fluid and provides the second side viscoelastic fluid to the flow chamber such that the second side viscoelastic fluid laminarly flows in the flow chamber in the form of a second side laminar flow moving from the one end of the flow chamber towards the another end of the flow chamber. The second side laminar flow is sandwiched between the top laminar flow and the bottom laminar flow and between the second side wall and the sample laminar flow. The second side flow input module controls a rate of flow of the second side viscoelastic fluid, hereinafter also referred to as the second side fluid, in the flow chamber.

The 'width' of the first side laminar flow means an extension of the first side laminar flow along the rectangular cross-section of the flow chamber from the first side wall of the flow chamber towards the second side wall of the flow chamber. In the flow cell, by controlling or varying the width of the first side laminar flow, the width and/or the height and/or the lateral position of the sample laminar flow is controlled or varied in the flow chamber, i.e., by moving the sample laminar flow between the desired region and the first side wall. By defining the width and/or the height and/or the lateral position of the sample laminar flow, the sample laminar flow is focused, i.e., one or more of the non-spherical biological entity is moved into or positioned into the desired region of the flow cell.

The 'width' of the second side laminar flow means an extension of the second side laminar flow along the rectangular cross-section of the flow chamber from the second side wall of the flow chamber towards the first side wall of the flow chamber. In the flow cell, by controlling or varying the width of the second side laminar flow, the width and/or the height and/or the lateral position of the sample laminar flow is controlled or varied in the flow chamber, i.e., by moving the sample laminar flow between the desired region and the second side wall. By defining the width and/or the height and/or the lateral position of the sample laminar flow, the sample laminar flow is focused, i.e., one or more of the non-spherical biological entity is moved into or positioned into the desired region of the flow cell.

The first and the second side fluids may be provided either simultaneously or sequentially in any order.

In another embodiment of the flow cell, the sample input module controls a rate of flow of the sample in the flow chamber. Thus amount of sample forming the sample laminar flow is controlled, which in turn contributes to the width and/or the height of the sample laminar flow.

In another embodiment of the flow cell, the flow chamber is a microfluidic channel. Thus the flow cell is compact.

A second aspect of the present technique presents a method for aligning a non-spherical biological entity carried in a sample into a desired region in a flow cell. The non-spherical biological entity is to be inspected by an imaging device having a depth of field in a field of view of the imaging device. The flow cell includes a flow chamber having a rectangular cross-section, a top wall, a bottom wall opposite to the top wall, a first side wall, a second side wall opposite to the first side wall and the desired region. In the method, a first viscoelastic fluid, hereinafter also referred to as the first fluid, is provided to the flow chamber such that the first fluid laminarly flows in the flow chamber in the form of a bottom laminar flow along the bottom wall from one end of the flow chamber towards another end of the flow chamber. Simultaneously along with or subsequent to the above mentioned step, in the method, a second viscoelastic fluid, hereinafter also referred to as the second fluid, is provided to the flow chamber such that the second fluid laminarly flows in the flow chamber in form of a top laminar flow along the top wall from the one end of the flow chamber towards the another end of the flow chamber.

Simultaneously along with or subsequent to the above mentioned step, in the method, the sample is provided to the flow chamber such that the sample along with the one or more non-spherical biological entity laminarly flows in the flow chamber in the form of a sample laminar flow from the one end of the flow chamber towards the another end of the flow chamber and wherein the sample laminar flow is sandwiched between the top laminar flow and the bottom laminar flow.

In the method, a rate of flow of the first fluid and/or a rate of flow of the second fluid in the flow chamber is controlled in order to achieve focusing of the sample carrying the non-spherical biological entity into the desired region. Furthermore, the desired region is aligned with the depth of field in the field of view of the imaging device.

In the method, by defining or by increasing or by decreasing the flow rate of the first fluid, the height of the bottom laminar flow in the flow cell is controlled or varied.

Similarly, by defining or by increasing or by decreasing the flow rate of the second fluid, the height of the top laminar flow in the flow cell is controlled or varied. By controlling or varying the height of the bottom and the top laminar flow, the width and/or the height and/or the longitudinal position of the sample laminar flow carrying the one or more non-spherical biological entity is controlled or varied. By defining the width and/or the height and/or the longitudinal position of the sample laminar flow, the sample laminar flow, and thus the non-spherical biological entity, is focused, i.e., moved into or positioned into the desired region of the flow cell. The differential shear, as explained hereinabove in the first aspect of the present technique, from the viscoelastic ambient top and bottom laminar flows orients the non-spherical biological entity in the desired region. The aligning of the non-spherical biological entity in the desired region is achieved by focusing and orienting the non-spherical biological entity in the desired region.

In an embodiment of the method, the rate of flow of the first viscoelastic fluid and/or the second viscoelastic fluid, respectively, are controlled by the bottom flow input module and/or the top flow input module such that within the flow chamber a distance between the bottom laminar flow and the top laminar flow is equal to or less than 10 microns, i.e., the height of the sample laminar flow is less than or equal to 10 microns. Preferably, the distance between the bottom laminar flow and the top laminar flow is between 6 microns and 8.5 microns and thus the when the non-spherical biological entity is erythrocyte, the erythrocytes get oriented as explained hereinabove in the first aspect of the present technique. Furthermore, when the non-spherical biological entity is an irregularly shaped leukocyte, then the irregularly shaped leukocyte is also oriented as explained hereinabove in the first aspect of the present technique. In another exemplary embodiment, the height of the sample laminar flow is less than or equal to 4 microns, and in this embodiment if the non-spherical biological entity is a platelet in addition to erythrocyte, the platelets along with the erythrocytes get oriented as explained hereinabove in the first aspect of the present technique.

In another embodiment of the method, a first side viscoelastic fluid, hereinafter also referred to as the first side fluid, is provided to the flow chamber such that the first side fluid laminarly flows in the flow chamber in the form of a first side laminar flow moving from the one end of the flow chamber towards the another end of the flow chamber. The first side laminar flow is sandwiched between the top laminar flow and the bottom laminar flow and between the first side wall and the sample laminar flow. Furthermore, a rate of flow of the first side fluid in the flow chamber is controlled. In the method, by controlling or varying the width of the first side laminar flow, the width and/or the height and/or the lateral position of the sample laminar flow is controlled or varied in the flow chamber, i.e., by moving the sample laminar flow between the desired region and the first side wall. By defining the width and/or the height and/or the lateral position of the sample laminar flow, the sample laminar flow is focused, i.e., one or more of the non-spherical biological entity is moved into or positioned into the desired region of the flow cell.

Furthermore in the method, a second side viscoelastic fluid, hereinafter also referred to as the second side fluid, is provided to the flow chamber such that the second side fluid laminarly flows in the flow chamber in the form of a second side laminar flow moving from the one end of the flow chamber towards the another end of the flow chamber. The second side laminar flow is sandwiched between the top laminar flow and the bottom laminar flow and between the second side wall and the sample laminar flow. Furthermore, a rate of flow of the second side fluid in the flow chamber is controlled. In the method, by controlling or varying the width of the second side laminar flow, the width and/or the height and/or the lateral position of the sample laminar flow is controlled or varied in the flow chamber, i.e., by moving the sample laminar flow between the desired region and the second side wall. By defining the width and/or the height and/or the lateral position of the sample laminar flow, the sample laminar flow is focused, i.e., one or more of the non-spherical biological entity is moved into or positioned into the desired region of the flow cell. The first and the second side fluids may be provided either simultaneously or sequentially in any order.

The non-spherical biological entity may be, but not limited to, an erythrocyte, a platelet, an irregularly shaped leukocyte, and so on and so forth. Thus the method is used to align the non-spherical biological entity in such a way that a face of the non-spherical biological entity which has maximum surface area, for example, a disc face of the erythrocyte, is presented for imaging and not a face of the non-spherical biological entity which has a smaller surface area, for example, sides of the erythrocyte.

In the method, the sample is blood. The sample may be undiluted blood and may not have had any pre-analytic sample preparation. For example, in an exemplary embodiment of the method, the sample does not include any agent for rounding up of the non-spherical biological entity in the sample, unlike the rounding up or spherization, i.e., changing a shape of the non-spherical biological entity from non-spherical to a spherical shape, which is performed during Mie scatter analysis of a similar non-spherical biological entity.

A third aspect of the present technique presents a system for focusing a non-spherical biological entity carried in a sample into a desired region. The system includes an imaging device and a flow cell. The imaging device has a field of view and the field of view includes a depth of field. The flow cell is according to as described hereinabove in the first aspect of the present technique. The desired region is aligned with the depth of field in the field of view of the imaging device. Thus, with the flow cell, the non-spherical biological entity is aligned in the desired region as explained herein above in the first and/or the second aspects of the present technique, and since the desired region of the flow cell is aligned with or overlaps the depth of field of the imaging device, the sample, therefore the non-spherical biological entity is aligned in the depth of field of the imaging device, i.e., the non-spherical biological entity is focused in a desired orientation.

In an embodiment of the system, the imaging device is an interferometry microscopy device. Thus the aligning of the non-spherical biological entity in the depth of field of the interferometry microscopy device is achieved and this in turn leads to obtaining of high quality or focused images of the non-spherical biological entity in the desired orientation of the non-spherical biological entity which then may be used for post imaging analysis, for example, volumetric measurements of components of the non-spherical biological entity, morphological studies of the contents of the non-spherical biological entity, and so and so forth.

In another embodiment of the system, the interferometry microscopy device is a digital holographic microscopy device. This presents an advantageous example of interferometry microscopy device that may be used to image the non-spherical biological entity without requiring complex sample preparation.

BRIEF DESCRIPTION OF THE DRAWINGS

The present technique is further described hereinafter with reference to illustrated embodiments shown in the accompanying drawing, in which:

FIG. 11 schematically illustrates an exemplary embodiment of the flow of sample with the bottom laminar flow, the top laminar flow, the first side laminar flow and the second side laminar flow and without the viscoelastic focusing;

FIG. 12 schematically illustrates a view of the non-spherical biological entity in an undesired orientation with respect to a direction of imaging;

FIG. 13 schematically illustrates the exemplary embodiment of the flow of FIG. 11 with viscoelastic focusing; and FIG. 14 schematically illustrates a view of the non-spherical biological entity in a desired orientation with respect to the direction of imaging; in accordance with aspects of the present technique.

DETAILED DESCRIPTION

Figure 1:
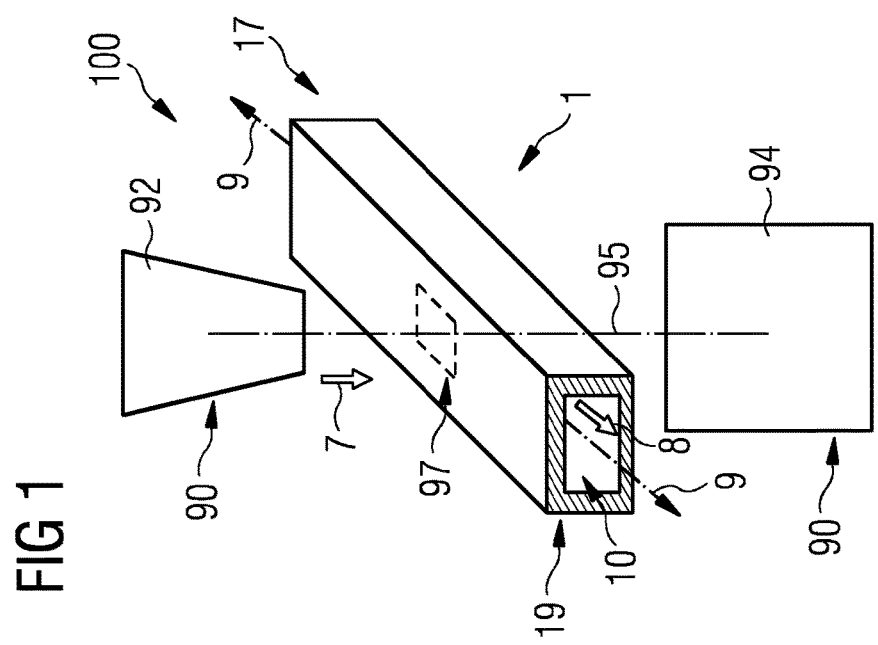
FIG. 1 schematically illustrates an exemplary embodiment of a system of the present technique.

Hereinafter, the above-mentioned and other features of the present technique are described in details. Various embodiments are described with reference to the drawings, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

It may be noted that in the present disclosure, the terms "first", "second", etc., are used herein only to facilitate discussion, and carry no particular temporal or chronological significance unless otherwise indicated.

The basic idea of the present technique is to align a non-spherical biological entity in a desired region of a flow cell. Aligning includes focusing the non-spherical biological entity in the desired region in a flow chamber of the flow cell and orienting the non-spherical biological entity in the desired region in the flow chamber of the flow cell. In the technique, the flow cell with the flow chamber having a rectangular cross-section is provided. In the flow chamber of such flow cell, the sample with its components, i.e., one or more non-spherical biological entities such as red blood cells, is flowed in a laminar flow. The laminarly flowing sample is sandwiched at least between two laminar flows, for example, a top and a bottom flow formed of a first and second viscoelastic fluid, respectively. By regulating a flow rate of one or both of these laminar flows, dimensions of these laminar flows may be influenced and since the sample laminar flow is sandwiched between these laminar flows, dimensions and position of the sample laminar flow are controlled within the flow chamber and thus the sample, and thereby the one or more non-spherical biological entities in the sample, is made to flow within a desired region of the flow chamber, thus focusing the non-spherical biological entity in the desired region. Additionally, the laminarly flowing sample may also be sandwiched between two laminar flows formed of a first side viscoelastic fluid and a second side viscoelastic fluid, respectively, say side flows that are perpendicularly aligned to the top and the bottom flows. By regulating a flow rate of one or both of these side flows, dimensions of the side flows may be influenced and since the sample laminar flow is sandwiched between the side flows in addition to the top and the bottom flows, dimensions and position of the sample laminar flow are controlled within the flow chamber and thus the sample, and thereby the non-spherical biological entity is further focused in the desired region, i.e., is made to flow within the desired region of the flow chamber.

The different shear, i.e., the gradient in shear acting on the non-spherical biological entity arising out of the ambient flow of the first and second viscoelastic fluids, and optionally and additionally from the first side and the second side viscoelastic fluids, acts on the non-spherical biological entity and orients the non-spherical biological entity in a desired orientation, i.e., in an orientation in which one of a largest or substantially larger side of the non-spherical biological entity is presented to the imaging light, for example, when the non-spherical biological entity is RBC, the desired orientation is when the RBC is oriented such that a disc face of the RBC is presented to the imaging light when the RBC is focused in the desired region and arranged along the axis. Thus, focusing of the non-spherical biological entity is achieved by regulating or controlling or defining the flow rates of the laminar flows between which the sample laminar flow is sandwiched, and orienting of the non-spherical biological entity is achieved by the differential shear created within the sample laminar flow by the ambient viscoelastic fluid flows, i.e., the top laminar flow and the bottom laminar flow, and additionally and optionally the first side and the second side laminar flows. The focusing and orienting of the non-spherical biological entity lead to aligning of the non-spherical biological entity.

FIG. 1 schematically presents a system 100 of the present technique. The system 100 includes an imaging device 90 for inspecting the sample (not shown in FIG. 1) and a flow cell 1 with a flow chamber 10. The imaging device 90 may have, but not limited to, a first part 92, for example, an illumination source 92, and a second part 94, for example, a detector with or without an interferometric unit. The imaging device 90 has a field of view 97, hereinafter the FOV 97, which represents an observable range of the imaging device 90, i.e., an object (not shown) is imaged by the imaging device 90 only when the object is positioned in the FOV 97. The imaging device 90 also has a focus within the FOV 97. The imaging device 90 has an axis 95 along which the imaging is performed by shining a probing radiation on the object, for example, a laser or a lower-coherent light source, such as a superluminescent diode, from a direction 7 onto the object or specimen to be inspected by the imaging device 90.

The focus is extended according to a depth of field (not shown in FIG. 1) of the imaging device 90. Thus, when the object is positioned in the depth of field around the focus of the imaging device 90, an 'in-focus' image of the object is obtainable. The focus and the depth of field of the imaging device 90 in the system 1 are arranged such that the focus and the depth of field around the focus of the imaging device 90 lie or fall within the flow chamber 10. The region within the depth of field around the focus of the imaging device 90 is a region (not shown) in which the object should be ideally positioned or focused or concentrated within the flow chamber 10 for obtaining in-focus images or interference patterns of the object.

The flow cell 1 has an extended channel or cavity forming the flow chamber 10 through which a specimen, for example a non-spherical biological entity such as a red blood cell (RBC), to be imaged or inspected by the imaging device 90 is passed or flowed in a direction 8, generally perpendicular to the direction 7. The specimen or the sample to be inspected flows in the flow chamber 10 from one end 17 to another end 19 of the flow chamber 10 and the FOV 97 of the imaging device 90 is arranged such that at least a part of the flow chamber 10 between the one end 17 and the another end 19 is positioned in the FOV 97 of the imaging device 90.

Figure 2:
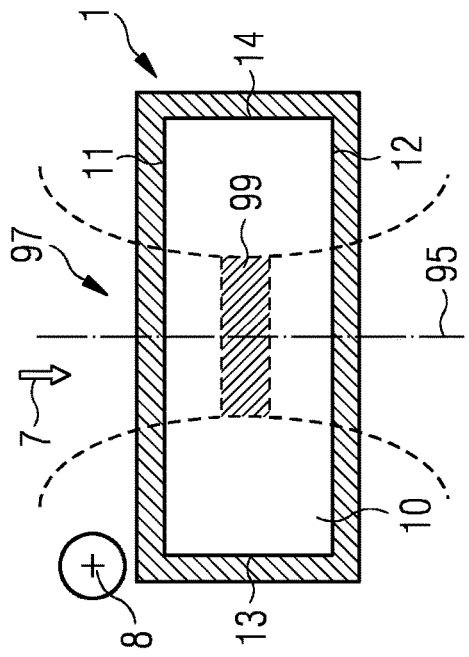
FIG. 2 schematically illustrates an exemplary embodiment of a flow cell.

Referring to FIG. 2 in combination with FIG. 1, the flow chamber 10 has been explained further. As depicted in FIG. 2, the flow chamber 10 has a rectangular cross-section when viewed from a direction (not shown) opposite to the direction 8. The flow chamber 10 includes a top wall 11, a bottom wall 12 opposite to the top wall 11, a first side wall 13 and a second side wall 14 opposite to the first side wall 13. Example dimensions of the flow chamber 10 may be, but not limited to, 20-2000 μm high, i.e., distance between the top wall 11 and the bottom wall 12, 100-5000 μm wide, i.e., distance between the first side wall 13 and the second side wall 14. The flow chamber 10 has a desired region 99 within the flow chamber 10. If the sample (not shown in FIGS. 1 and 2) is passed or flowed through the desired region 99 and if the FOV 97 and the depth of field around the focus of the imaging device 90 are arranged such that the depth of field around the focus of the imaging device 90 overlaps or aligns with the desired region 99, then in-focus images or interference patterns are obtainable for part of the sample in the desired region 99 of the flow chamber 10 when imaging or inspection of the sample is performed with the imaging device 90. It may be noted that the desired region 99, hereinafter the region 99, has been schematically depicted in FIG. 2 to be positioned in a center location of the cross-section of the flow chamber 10, however, it is well within the scope of the present technique that the region 99 may be present in a non-central location of the cross-section of the flow chamber 10.

Figure 3:
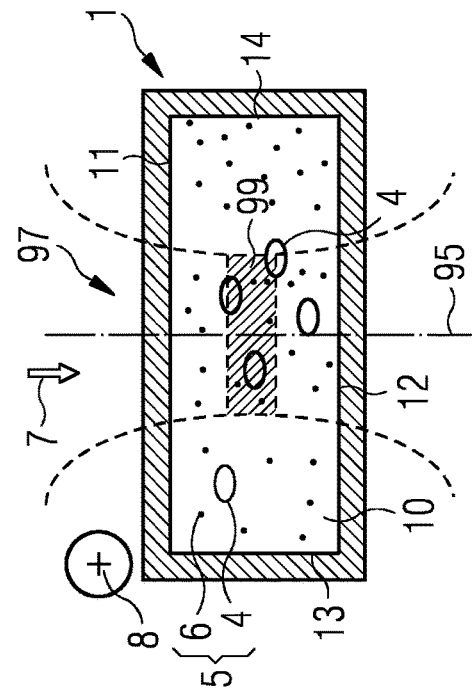
FIG. 3 schematically illustrates the exemplary embodiment of the flow cell of FIG. 2 with a sample flowing.

FIG. 3, in contrast to FIG. 2, schematically presents a sample 5 flowing through the flow chamber 10. The sample 5 has non-spherical biological entities 4, for example, corpuscles such as RBCs, and a fluidic carrier 6 for the non-spherical biological entities 4. For example, the fluidic carrier 6 may be diluted or undiluted blood plasma, a buffer, and so on and so forth. The non-spherical biological entities 4 have been hereinafter also referred to as the entity 4 or the RBC 4. When the sample 5 flows through the flow chamber 10, as depicted in FIG. 3, some of the RBCs 4 are in the desired region 99 and some are outside the desired region 99. If the FOV 97 and the depth of field around the focus of the imaging device 90 are arranged such that the depth of field around the focus of the imaging device 90 overlaps or aligns with the desired region 99, then some RBCs 4 are in the FOV 97, while some of the RBCs 4 are outside the FOV 97. Furthermore, some of the RBCs 4 are in the FOV 97 but either completely or partially outside the region 99. Even when a particular RBC 4 is in the FOV 97, the particular RBC 4 may be in an orientation which is undesirable for image acquisition, for example, the RBC 4 in the FOV 97 may be oriented such that a side of the disc of RBC 4 is presented for observation by the imaging device 90. This has been explained later with reference to FIG. 11.

Figure 4:
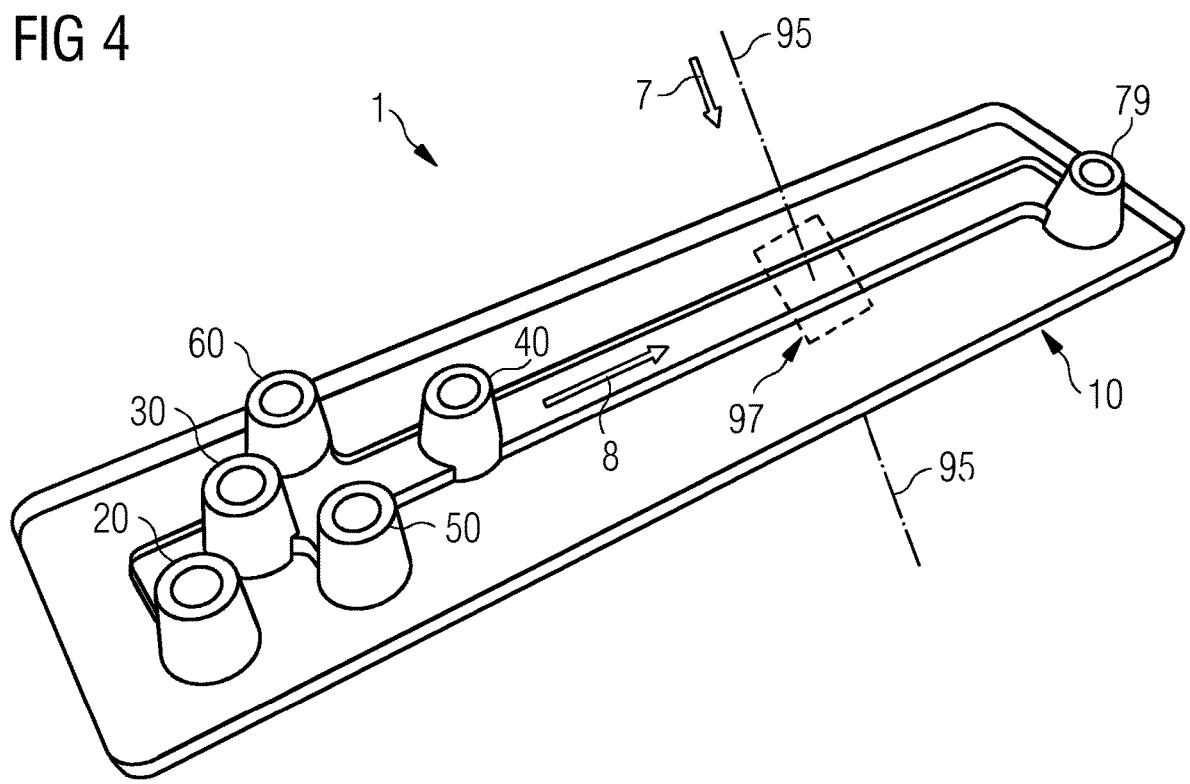
FIG. 4 schematically illustrates an exemplary embodiment of the flow cell of the present technique.
Figure 5:
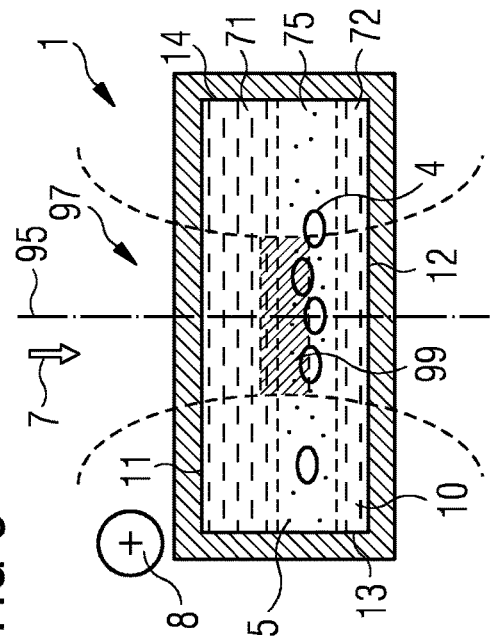
FIG. 5 schematically illustrates an exemplary embodiment of the flow cell depicting a bottom laminar flow and a top laminar flow.
Figure 6:
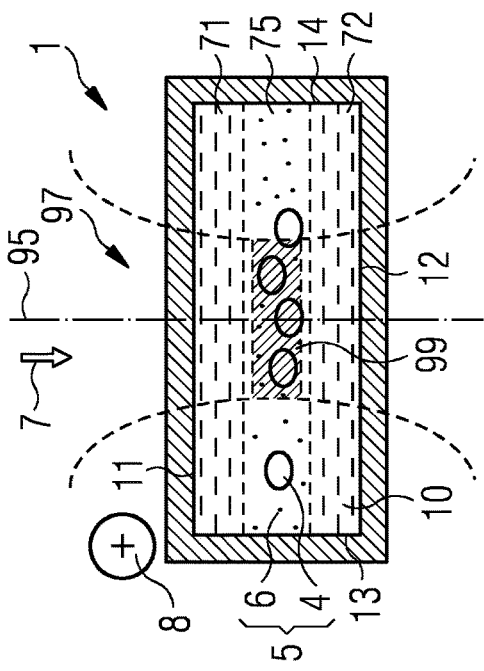
FIG. 6 schematically illustrates the embodiment of the flow cell of FIG. 5 depicting an exemplary scheme for working of the flow cell.

Referring to FIGS. 4, 5, and 6 in combination with FIGS. 1 and 2, the flow cell 1 of the present technique is explained hereinafter. As shown in FIG. 4, the flow cell 1, besides having the flow chamber 10 as explained in reference to FIG. 2, also includes a bottom flow input module 20, a sample input module 30, and a top flow input module 40. In an exemplary embodiment of the flow cell 1, the flow chamber 10 is a microfluidic channel.

As shown in FIG. 5 in combination with FIG. 4, the bottom flow input module 20 receives a first viscoelastic fluid (not shown), hereinafter also referred to as the first fluid, and provides the first fluid to the flow chamber 10. The bottom flow input module 20, hereinafter also referred to as the module 20, provides the first fluid to the flow chamber 10 in such a way that the first fluid laminarly flows along the bottom wall 12 in the flow chamber 10 from the one end 17 (shown in FIG. 1) of the flow chamber 10 towards the another end 19 (shown in FIG. 1) of the flow chamber 10. The laminarly flowing first fluid forms a bottom laminar flow 72. The bottom flow input module 20 controls a rate of flow of the first fluid in the flow chamber 10. The term 'control' as used herein includes: defines or decides, restricts, sets up, increases and/or decreases the rate of flow of the first fluid in the flow chamber 10 forming the bottom laminar flow 72, hereinafter also referred to as the flow 72. Forming laminar flow of fluids in a flow chamber is a well known technique in the field of hydrodynamics or fluid dynamics and has not been described herein in detail for sake of brevity. The module 20 may include, but not limited to, flow channels, valves, pumps, flow meters, etc. The flow 72 may be understood as a rectangular parallelepiped shaped flow extending along the direction 8 in the flow chamber 10 and contiguous with the bottom wall 12.

However, as an example, for forming laminar flows of the present disclosure mentioned hereinabove and hereinafter, the fluids are injected either by syringe or peristaltic pumping systems. In both cases either drawing or pressure driven transport of the fluids can be applied. The speed of the fluid (sum of all different flows) ranges from 0.01 to 10 μL/sec. The absolute pressure in this flow regime is between 0.001 and 1 bar.

The top flow input module 40 receives a second viscoelastic fluid (not shown), hereinafter also referred to as the second fluid, and provides the second fluid to the flow chamber 10. The top flow input module 40, hereinafter also referred to as the module 40, provides the second fluid to the flow chamber 10 in such a way that the second fluid laminarly flows along the top wall 11 in the flow chamber 10 from the one end 17 (shown in FIG. 1) of the flow chamber 10 towards the another end 19 (shown in FIG. 1) of the flow chamber 10. The laminarly flowing second fluid forms a top laminar flow 71. The top flow input module 20 controls a rate of flow of the second fluid in the flow chamber 10. The term 'control' as used herein includes: defines or decides, restricts, sets up, increases and/or decreases the rate of flow of the second fluid in the flow chamber 10 forming the top laminar flow 71, hereinafter also referred to as the flow 71. The module 40 may include, but not limited to, flow channels, valves, pumps, flow meters, etc. The flow 71 may be understood as a rectangular parallelepiped shaped flow extending along the direction 8 in the flow chamber 10 and contiguous with the top wall 11.

The sample input module 30 receives the sample 5 and provides the sample 5 to the flow chamber 10. The sample input module 30, hereinafter also referred to as the module 30, provides the sample 5 to the flow chamber 10 in such a way that the sample 5 laminarly flows sandwiched between the flow 71 and the flow 72 from the one end 17 (shown in FIG. 1) of the flow chamber 10 towards the another end 19 (shown in FIG. 1) of the flow chamber 10. The laminarly flowing sample 5 forms a sample laminar flow 75. The sample input module 30 controls a rate of flow of the sample 5 in the flow chamber 10. The term 'control' as used herein includes: defines or decides, restricts, sets up, increases and/or decreases the rate of flow of the sample 5 in the flow chamber 10 forming the sample laminar flow 75, hereinafter also referred to as the flow 75. The module 30 may include, but not limited to, flow channels, valves, pumps, flow meters, etc. The flow 75 may be understood as a rectangular parallelepiped shaped flow extending along the direction 8 in the flow chamber 10 and sandwiched between the flow 71 and the flow 72. In an exemplary embodiment, the sample 5, and thereby the flow 75 does not contain any viscoelastic fluids or materials.

In the flow chamber 10, by defining or setting up or by increasing or by decreasing the flow rate of the first fluid, the height of the flow 72 is fixed or controlled or varied. Similarly, by defining or setting up or by increasing or by decreasing the flow rate of the second fluid, the height of the flow 71 is fixed or controlled or varied.

In the flow cell 1, by controlling or varying the height of the flow 71 and/or the flow 72, the width and/or the height and/or the longitudinal position of the flow 75 is controlled or varied. For example as schematically depicted in FIG. 5, the flow 75 is now restricted to or concentrated in or focused at least partly in the region 99. In an exemplary embodiment (not shown) of the flow cell 1, the desired region 99 extends from the first side wall 13 to the second side wall 14 and then the flow 75 is substantially positioned in the desired region 99, thereby the RBCs 4 are focused in the desired region 99.

As depicted in FIG. 6, an exemplary working of the flow cell 1 has been schematically depicted. If relative heights of the flow 71 and the flow 72 are such that the flow 75 is below or beneath the desired region 99, as shown in FIG. 6, then by controlling the flow rates of the first and the second fluids, for example, by increasing the flow rate of the first fluid via the module 20 and/or decreasing the flow rate of the second fluid via module 40, the relative heights of the flow 72 and the flow 71 are altered thereby bringing the flow 75 at least partly in the region 99, as shown in FIG. 5. Alternatively, if relative heights of the flow 71 and the flow 72 are such that the flow 75 is above (not shown) the desired region 99, then by controlling the flow rates of the first and the second fluids, for example, by decreasing the flow rate of the first fluid via the module 20 and/or increasing the flow rate of the second fluid via module 40, the relative heights of the flow 72 and the flow 71 are altered thereby bringing the flow 75 at least partly in the region 99. In short the height of the sample laminar flow 75 and/or the longitudinal position of the sample laminar flow 75 is decided or fixed or adjusted by altering the flow rates of the first and/or the second fluids via the modules 20 and/or 40.

Figure 7:
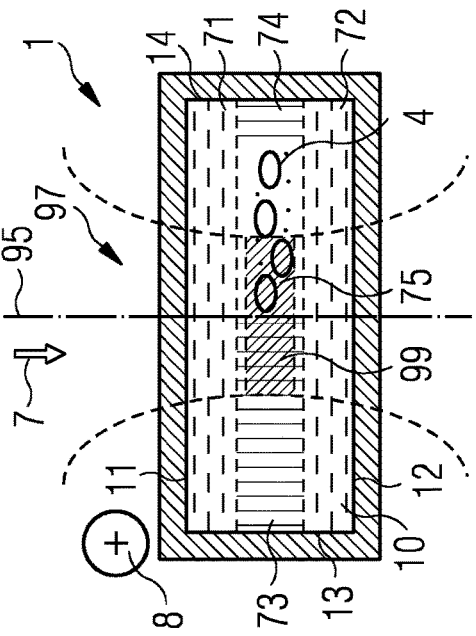
FIG. 7 schematically illustrates an exemplary embodiment of the flow cell depicting a first side laminar flow and a second side laminar flow.

Referring to FIG. 4 in combination with FIGS. 7 and 8, other exemplary embodiments of the flow cell 1 have been explained hereinafter. In an embodiment of the flow cell 1 a first side flow input module 50, hereinafter the module 50, is included. The module 50 receives a first side viscoelastic fluid (not shown), hereinafter also referred to as the first side fluid, and provides the first side fluid to the flow chamber 10. The first side fluid is provided by the module 50 in such a way that the first side fluid laminarly flows along the first side wall 13 in the flow chamber 10 from the one end 17 (shown in FIG. 1) of the flow chamber 10 towards the another end 19 (shown in FIG. 1) of the flow chamber 10.

The laminarly flowing first side fluid forms a first side laminar flow 73, hereinafter also referred to as the flow 73. The flow 73 is sandwiched between the flow 71 and the flow 72 and between the first side wall 13 and the flow 75, as shown in FIG. 7.

The module 50 controls a rate of flow of the first side fluid in the flow chamber 10. The term 'control' as used herein includes: defines or decides, restricts, sets up, increases and/or decreases the rate of flow of the first side fluid in the flow chamber 10 forming the flow 73. The module 50 may include, but not limited to, flow channels, valves, pumps, flow meters, etc. The flow 73 may be understood as a rectangular parallelepiped shaped flow extending along the direction 8 in the flow chamber 10 and contiguous with a part of the first side wall 13 on one face and the flow 75 on the opposite face, and also contiguous on another face with flow 71 and on a face opposite to the another face with the flow 72.

In another embodiment of the flow cell 1, a second side flow input module 60, hereinafter also referred to as the module 60, is included. The module 60 receives a second side viscoelastic fluid (not shown), hereinafter also referred to as the second side fluid, and provides the second side fluid to the flow chamber 10. The second side fluid, for example, water, is provided by the module 60 in such a way that the second side fluid laminarly flows along the second side wall 14 in the flow chamber 10 from the one end 17 (shown in FIG. 1) of the flow chamber 10 towards the another end 19 (shown in FIG. 1) of the flow chamber 10. The laminarly flowing second side fluid forms a second side laminar flow 74, hereinafter also referred to as the flow 74. The flow 74 is sandwiched between the flow 71 and the flow 72 and between the second side wall 14 and the flow 75, as shown in FIG. 7.

The module 60 controls a rate of flow of the second side fluid in the flow chamber 10. The term 'control' as used herein includes: defines or decides, restricts, sets up, increases and/or decreases the rate of flow of the second side fluid in the flow chamber 10 forming the flow 74. The module 60 may include, but not limited to, flow channels, valves, pumps, flow meters, etc. The flow 74 may be understood as a rectangular parallelepiped shaped flow extending along the direction 8 in the flow chamber 10 and contiguous with a part of the second side wall 14 on one face and the flow 75 on the opposite face, and also contiguous on another face with flow 71 and on a face opposite to the another face with the flow 72.

In the flow chamber 10, by defining or setting up or by increasing or by decreasing the flow rate of the first side fluid, the width of the flow 73 is fixed or controlled or varied. Similarly, by defining or setting up or by increasing or by decreasing the flow rate of the second side fluid, the width of the flow 74 is fixed or controlled or varied. In the flow cell 1, by controlling or varying the width of the flow 73 and/or the flow 74, the width and/or the height and/or the lateral position of the flow 75 is controlled or varied. For example, as schematically depicted in FIG. 7, the flow 75, and thus the RBCs 4, is now restricted to or concentrated in or focused in the region 99.

Figure 8:
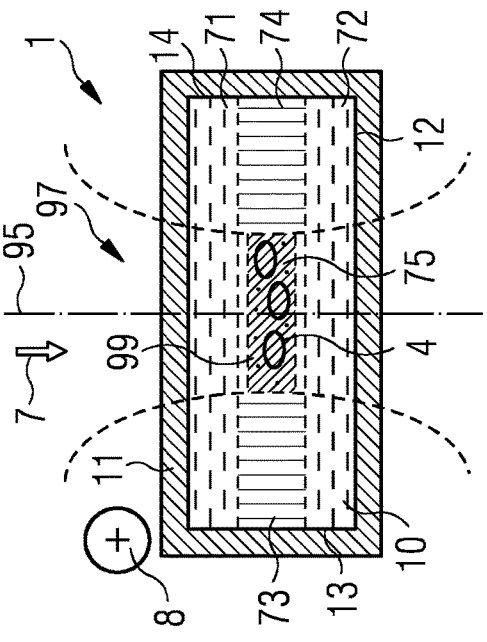
FIG. 8 schematically illustrates the embodiment of the flow cell of FIG. 7 depicting an exemplary scheme for working of the flow cell.

As depicted in FIG. 8, an exemplary working of the flow cell 1 has been schematically depicted. If relative widths of the flow 73 and the flow 74 are such that the flow 75 is at least partly shifted from the desired region 99 towards the second side wall 14, as shown in FIG. 8, then by controlling the flow rates of the first side and/or the second side fluids, for example, by increasing the flow rate of the second side fluid via the module 60 and/or decreasing the flow rate of the first side fluid via module 50, the relative widths of the flow 74 and the flow 73 are altered thereby bringing the flow 75 in the region 99, as shown in FIG. 7. Alternatively, if relative widths of the flow 73 and the flow 74 are such that the flow 75 is shifted (not shown) to the other side of the desired region 99, i.e., towards the first side wall 13, then by controlling the flow rates of the first side and the second side fluids, for example, by increasing the flow rate of the first side fluid via the module 50 and/or decreasing the flow rate of the second fluid via module 60, the relative widths of the flow 73 and the flow 74 are altered thereby bringing the flow 75 in the region 99, as shown in FIG. 7. In short, the width of the sample laminar flow 75 and/or the lateral position of the sample laminar flow 75 is decided or fixed or adjusted by altering the flow rates of the first side and/or the second side fluids via the modules 50 and/or 60.

As shown in FIG. 4, in another embodiment of the flow cell 1, a flow exit 79 is present for allowing the flows 71, 72, 73, 74 and 75 to exit the flow chamber 10. In presence of the flows 71, 72, 73, 74 covering flow 75 on all sides, the RBCs 4 are physically removed from the walls 11, 12, 13 and 14 and thus never in contact with the walls 11, 12, 13 and 14 and therefore none of the RBCs 4 adhere to the walls 11, 12, 13 or 14 and disintegration of the RBCs 4 to form debris is avoided.

Figure 9:
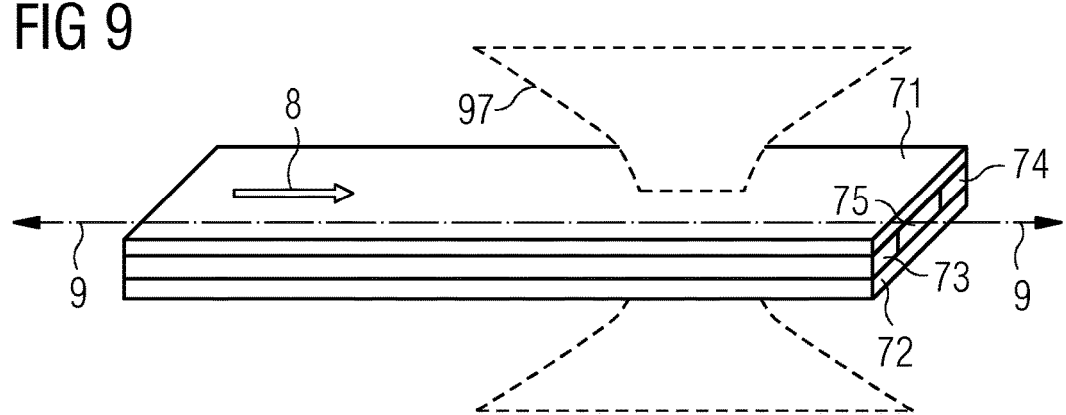
FIG. 9 schematically illustrates an exemplary embodiment of the flow.
Figure 10:
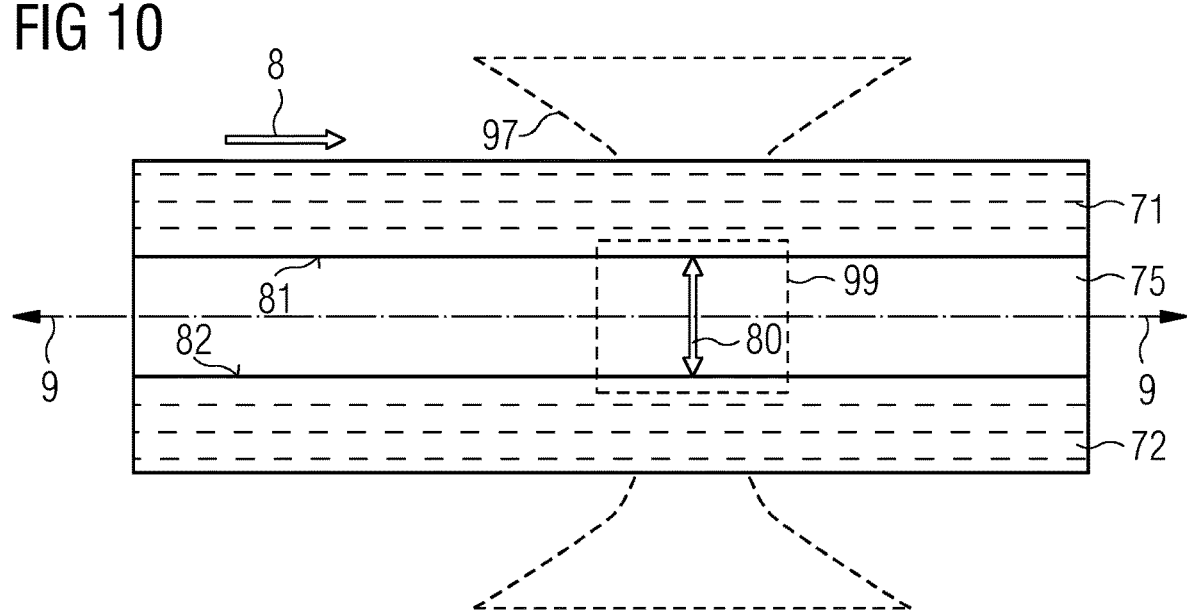
FIG. 10 schematically illustrates an exemplary embodiment of the flow cell of the present technique depicting a cross-section perpendicular to a top and bottom wall of the flow cell and parallel to a first side and second side wall of the flow cell.

FIG. 9 depicts the flows 71, 72, 73, 74, 75 and the flow direction 8, and FIG. 10 schematically illustrates an exemplary embodiment of the flow cell 1 depicting a cross-section perpendicular to the top wall 11 and the bottom wall 12 of the flow cell 1 and parallel to the first side wall 13 and the second side wall 14 of the flow cell 1.

Since the flows 71 and 72 are viscoelastic in nature, the flow 75 and thus the RBC 4 in the flow 75 experiences a shear force or shear stress or simply shear resulting from ambient viscosity from the viscoelastic fluids flowing as the flows 71 and 72. The shear experienced by the RBC 4 is greater at a boundary 81 between the flow 75 and the flow 71 and at a boundary 82 between the flow 75 and the flow 72 compared to an inside or center 85 of the flow 75. In other words, the shear experienced by the RBC 4 decreases at different levels of the flow 75 along a height 80 of the flow 75 when approaching the center 85 from the boundary 81 and/or the boundary 82. More specifically the shear experienced by the RBC 4 along the height 85 of the flow 75 gradually and continuously decreases from the boundary 81 to the center 85 and thus setting up a gradient in the flow 75 between the boundary 81 and the center 85, and similarly the shear experienced by the RBC 4 along the height 85 of the flow 75 gradually and continuously decreases from the boundary 82 to the center 85 and thus setting up a gradient in the flow 75 between the boundary 82 and the center 85. As a result of the difference in the shear acting on the RBC 4, the RBC 4 aligns itself within the flow 75 such that to experience the minimum possible sum of shear, or in other words the RBC 4 gets streamlined with respect to the shear experienced by it from the flows 71 and 72. Similar shear gradients may set up in the flow 75 resulting from the flows 73 and 74, however, the net resultant of the shears due to the flows 71 to 74 is such that the RBC 4 is forced to align with disc face parallel to the flows 71 and 72, for example, by making the flows 71 and 72 such that the shear due to the flows 71 and 72 is greater than the shear due to the flows 73 and 74.

In an embodiment of the flow cell, the bottom flow input module 20 and/or the top flow input module 40 control the rate of flow of the first fluid and/or the second fluid, respectively, such that within the flow chamber 10, and particularly within the region 99, the height 80, i.e., a distance between the flow 71 and the flow 75 is equal to or less than 10 microns. Preferably, the height 80 is between 6 microns and 8.5 microns. In another exemplary embodiment the height 80 is less than or equal to 4 microns.

The viscoelastic fluids used to form the flows 71 to 74 may include a solvent, for example, water or a suitable buffer, in which a viscoelastic material is provided or dissolved. One example of viscoelastic material is Polyvinylpyrrolidone (PVP) which may have a molecular weight of around 1.3 million Dalton (Da) and may be present in 0.9% w/v in the solvent. Besides PVP, other polymers with sufficiently high viscosity (e.g. >5 cP) and elasticity may also be used, for example, polymers with molecular weight ranging between 50 to 1000 kDa. Some examples of polymers including PVP are Polyacrylamide, polyethyleneglycol, polyglucose, a cellulose derivative, a polysaccharide, and a combination thereof. The polymers may be diluted in isotonic buffer systems in concentrations between 0.1 and 3% of polymer w/v to form viscoelastic fluids of the present technique.

FIGS. 11 and 13 represent cases where the RBC 4 has not been focused or concentrated in the region 99 with the help of the flows 71 and 72 and additionally and optionally with the help of flows 73 and 74. The region 99 is shown to be overlapping with the depth of field 98 in the FOV 97. Although the RBC 4 depicted in FIG. 11 is in the FOV 98 and in the desired region 99, the RBC 4 is not in a desired orientation. As shown in FIG. 11, the flows 71 and 72 and optionally the flows 73 and 74 are arranged in the flow chamber 10 such that the flow 75 is not focused in the desired region 99 as an effect of focusing achieved by flows 71 to 74 and thus the flows 71 to 74 are too far away from the desired region 99 to exert adequate viscoelastic shear on the RBC 4, or in other words, the flows 71 to 74 are too far away from the desired region 99 to form sufficient and suitable gradient within the flow 75 and in absence of gradient due to ambient viscoelastic flows, i.e., flow 71 and flow 72, and additionally and optionally flow 73 and flow 74, the RBC 4 though in the region 99 may be oriented to show up-ended side toward the axis 95 when viewed along the direction 7 as shown in FIGS. 11 and 12. When the RBC 4 is in side showing orientation as depicted by FIGS. 11 and 12, i.e., when the RBC 4 presents side to the axis 95 when viewed in the direction 7 the image or interference patterns obtained present less morphological features and are less useful for volumetric analysis as compared to a case when the RBC 4 in an orientation when the RBC 4 presents disc face or flat side to the axis 95 when viewed in the direction 7.

As shown in FIG. 13, when the viscoelastic focusing of the RBC 4 is performed, i.e., the flows 71 and 72 and optionally the flows 73 and 74 are arranged in the flow chamber 10 such that the flow 75 is focused in the desired region 99 as an effect of focusing achieved by flows 71 to 74 and thus the flows 71 to 74 are closer to the desired region 99 to exert adequate viscoelastic shear on the RBC 4, or in other words, the flows 71 to 74 are in vicinity of the desired region 99, though not within the desired region 99, to form sufficient and suitable gradient within the flow 75 and in presence of gradient due to ambient viscoelastic flows, i.e., flow 71 and flow 72, and additionally and optionally flow 73 and flow 74, the RBC 4 rotates and is oriented to show flat face or disc face toward the axis 95 when viewed along the direction 7 as shown in FIGS. 13 and 14. The orientation of the RBC 4 is a result of the effect of streamlining of the RBC 4 such that net shear acting on the RBC 4 is as less as possible, for example, disc face of the RBC will be oriented substantially parallel to the top wall 11 and the bottom wall 12, for the embodiment depicted in FIG. 13.

When the RBC 4 is in disc face showing orientation as depicted by FIGS. 13 and 14, i.e., when the RBC 4 presents disc face or flat face to the axis 95 when viewed in the direction 7 the image or interference patterns obtained present more morphological features and are more useful for volumetric analysis as compared to a case when the RBC 4 in the orientation shown in FIGS. 11 and 12. The flow chamber 10 serves as a conduit for the flows 71, 72, 73, 74 and 75 and at the same time acts as a seat for setting up the gradient within the flow 75 resulting from the ambient viscoelastic flows, i.e., flows 71 and 72, and optionally and additionally flows 73 and 74.

As shown in FIG. 1, the system 100 includes the imaging device 90. In one embodiment of the system 100, the second part 94 of the imaging device 90 includes an interferometry unit (not shown) and a detector (not shown). The interferometry unit may be a common path interferometry unit or different path interferometry unit. In common path interferometry unit, a light beam is shone or impinged on the sample 5 from the first part 92 of the imaging device 90 and then the light beam emerging after interacting with the sample 5 is split into a reference beam (not shown) and an object beam (not shown). Subsequently, object information is filtered out or deleted from the reference beam and then the filtered reference beam is superimposed with the object beam to detect the interference pattern at the detector. In different path interferometry unit, a light beam to be incident on the sample 5 is first split into an object beam (not shown) and a reference beam (not shown), i.e., the light beam is split into the reference beam and the object beam before interacting with the sample 5. The object beam is then shone or impinged upon the sample 5 but the reference beam is directed to another optical path (not shown) within the different path interferometric unit and is not shone or impinged upon the sample 5, i.e., the RBC 4. Subsequently, the object beam carrying object information is superimposed with the reference beam to obtain interference pattern at the detector. The interference pattern obtained as an output of the common path or different path interferometry is analyzed. The interference pattern also referred to as image of the RBC 4 represents characteristics of the RBC 4 such as physical structures in the RBC 4, morphology of the RBC 4, and so on and so forth. Designs, setups and principle of working of the common path interferometry and the different path interferometry are known in the field of interferometric microscopy and not described herein in details for sake of brevity.

The present technique also encompasses a method for aligning, i.e., focusing and orienting, the RBC 4 in the sample 5 into the desired region 99 in the flow cell 1. The flow cell 1 is same as the flow cell 1 described in reference to FIGS. 1 to 10 and presented in accordance with the first aspect of the present technique. In the method, the first fluid, the second fluid and the sample 5 carrying one or more of the RBCs 4 are provided to the flow chamber 10. The first fluid, the second fluid and the sample 5 may be provided either simultaneously or sequentially in any order. The first fluid is provided to the flow chamber 10 such that the first fluid laminarly flows along the bottom wall 12 in the flow chamber 10 from one end 17 of the flow chamber towards another end 19 of the flow chamber 10. The laminarly flowing first fluid forms the bottom laminar flow 72, as described hereinabove with reference to FIGS. 1 to 14. The second fluid is provided to the flow chamber 10 such that the second fluid laminarly flows along the top wall 11 in the flow chamber 10 from the one end 17 of the flow chamber 10 towards the another end 19 of the flow chamber 10. The laminarly flowing second fluid forms the top laminar flow 71, as described hereinabove with reference to FIGS. 1 to 14. The sample 5 is provided to the flow chamber 10 such that the sample 5 laminarly flows in the flow chamber 10 in form of the sample laminar flow 75 from the one end 17 of the flow chamber 10 towards the another end 19 of the flow chamber 10. The laminarly flowing sample 5 forms the sample laminar flow 75, as described hereinabove with reference to FIGS. 1 to 14. The flow 75 is sandwiched between the flow 71 and the flow 72.

In the method, a rate of flow of the first fluid and a rate of flow of the second fluid in the flow chamber 10 are controlled. In the method, by defining or setting or fixing or by increasing or by decreasing the flow rate of the first and/or the second fluid, the height of the flow 72 and/or the flow 71 in the flow cell 10 is controlled or varied which in turn effects the width and/or the height and/or the longitudinal position of the flow 75 which is thereby controlled or varied by controlling the flow rates of the first and the second fluids. By defining the width and/or the height and/or the longitudinal position of the flow 75, the flow 75, and thereby the RBC 4, is focused, i.e., moved into or positioned into the desired region 99 of the flow cell 1. In the method, the desired region 99 is aligned, as shown in FIGS. 11 and 13, with the depth of field 98 in the field of view 97 of the imaging device 90 shown in FIG. 1. The RBC 4 is aligned, i.e., focused and oriented as explained hereinabove with reference to FIGS. 1 to 14.

In an exemplary embodiment of the method, the first side fluid and the second side fluid is provided to the flow chamber 10 to form the flow 73 and the flow 74, respectively, and the rate of flow of the flow 73 and the flow 74 in the chamber 10 is controlled. The providing of the flows 73 and 74 and controlling the rate of flow of the flows 73 and 74 is same as described hereinabove with reference to FIGS. 1 to 14.

By using the present technique and applying it to image RBCs 4 using digital holographic microscopy device 90, holograms, i.e., phase image and bright field image is recorded with a velocity 50-200 frames per second. The probing of the sample 5 by the imaging device may be performed at various physical settings of the sample 5, for example, the sample 5 when in the fluid chamber 10 may be at a temperature between 4 and 45° C. These temperature settings allow for the simulations of various pathological situations, e.g.: body temperature dependent disseminated coagulopathy, infection dependent adhesion of platelets to white blood cells, simulation of fever, and so on and so forth.

While the present technique has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The invention claimed is:

1. A flow cell for aligning a non-spherical biological entity carried in a sample into a desired region in the flow cell, the flow cell comprising:
   a flow chamber having a rectangular cross-section, a top wall, a bottom wall opposite to the top wall, a first side wall, a second side wall opposite to the first side wall and the desired region;
   a bottom flow input module configured to receive a first viscoelastic fluid and to provide the first viscoelastic fluid to the flow chamber such that the first viscoelastic fluid laminarly flows in the flow chamber as a bottom laminar flow along the bottom wall from one end of the flow chamber towards a second end of the flow chamber, wherein the bottom flow input module is further configured to control a rate of flow of the first viscoelastic fluid in the flow chamber, the bottom flow input module comprising at least one of a fluid connector, a flow channel, a valve, a pump, and a flow meter;
   a top flow input module configured to receive a second viscoelastic fluid and to provide the second viscoelastic fluid to the flow chamber such that the second viscoelastic fluid laminarly flows in the flow chamber as a top laminar flow along the top wall from the one end of the flow chamber towards the second end of the flow chamber, wherein the top flow input module is further configured to control a rate of flow of the second viscoelastic fluid in the flow chamber, the top flow input module comprising at least one of a fluid connector, a flow channel, a valve, a pump, and a flow meter; and
   a sample input module configured to receive the sample and to provide the sample to the flow chamber such that the sample laminarly flows in the flow chamber as a sample laminar flow from the one end of the flow chamber towards the second end of the flow chamber and the sample laminar flow is sandwiched between the top laminar flow and the bottom laminar flow, the sample input module comprising at least one of a fluid connector, a flow channel, a valve, a pump, and a flow meter; wherein:
   the bottom flow input module is further configured to produce a shear force at a boundary between the bottom laminar flow and the sample laminar flow via the control of the rate of flow of the bottom laminar flow;
   the top flow input module is further configured to produce a shear force at a boundary between the top laminar flow and the sample laminar flow via the control of the rate of flow of the top laminar flow; and
   the shear forces produced by the bottom flow input module and the top flow input module are each greater than any side shear force at a boundary between the sample laminar flow and the first side wall and a boundary between the sample laminar flow and the second side wall to cause a disc face of the non-spherical biological entity to align parallel to the top and bottom laminar flows.

2. The flow cell according to claim 1, wherein the bottom flow input module or the top flow input module is configured to control the rate of flow of the first viscoelastic fluid or the second viscoelastic fluid, respectively, such that within the flow chamber a distance between the bottom laminar flow and the top laminar flow is equal to or less than 10 microns.

3. The flow cell according to claim 1, further comprising:
   a first side flow input module configured to receive a first side viscoelastic fluid and to provide the first side viscoelastic fluid to the flow chamber such that the first side viscoelastic fluid laminarly flows in the flow chamber as a first side laminar flow sandwiched between the top laminar flow and the bottom laminar flow and between the first side wall and the sample laminar flow, wherein the first side flow input module is further configured to control a rate of flow of the first side viscoelastic fluid in the flow chamber and wherein the first side laminar flow moves from the one end of the flow chamber towards the second end of the flow chamber, the first side flow input module comprising at least one of a fluid connector, a flow channel, a valve, a pump, and a flow meter; and
   a second side flow input module configured to receive a second side viscoelastic fluid and to provide the second side viscoelastic fluid to the flow chamber such that the second side viscoelastic fluid laminarly flows in the flow chamber as a second side laminar flow sandwiched between the top laminar flow and the bottom laminar flow and between the second side wall and the sample laminar flow, wherein the second side flow input module is further configured to control a rate of flow of the second side viscoelastic fluid in the flow chamber and wherein the second side laminar flow moves from the one end of the flow chamber towards the second end of the flow chamber, the second side flow input module comprising at least one of a fluid connector, a flow channel, a valve, a pump, and a flow meter.

4. The flow cell according to claim 1, wherein the flow chamber is a microfluidic channel.

5. A system for aligning a non-spherical biological entity carried in a sample into a desired region, the system comprising:
   an imaging device having a field of view, wherein the field of view includes a depth of field; and
   a flow cell according to claim 1;
   wherein the desired region is aligned with the depth of field in the field of view of the imaging device.

6. The system according to claim 5, wherein the imaging device is an interferometry microscopy device.

7. The system according to claim 6, wherein the interferometry microscopy device is a digital holographic microscopy device.

8. A method for aligning a non-spherical biological entity carried in a sample into a desired region in a flow cell, the non-spherical biological entity to be inspected by an imaging device having a depth of field in a field of view of the imaging device, the flow cell comprising a flow chamber having a rectangular cross-section, a top wall, a bottom wall opposite to the top wall, a first side wall, a second side wall opposite to the first side wall and the desired region; the method comprising:
   providing a first viscoelastic fluid to the flow chamber such that the first viscoelastic fluid laminarly flows in the flow chamber as a bottom laminar flow along the bottom wall from one end of the flow chamber towards a second end of the flow chamber;
   providing a second viscoelastic fluid to the flow chamber such that the second viscoelastic fluid laminarly flows in the flow chamber as a top laminar flow along the top wall from the one end of the flow chamber towards the second end of the flow chamber;
   providing the sample to the flow chamber such that the sample comprising the non-spherical biological entity laminarly flows in the flow chamber as a sample laminar flow from the one end of the flow chamber towards the second end of the flow chamber and wherein the sample laminar flow is sandwiched between the top laminar flow and the bottom laminar flow;

controlling a rate of flow of the first viscoelastic fluid or a rate of flow of the second viscoelastic fluid in the flow chamber to focus the sample carrying the non-spherical biological entity into the desired region and to produce a shear force at a boundary between the top or bottom laminar flow and the sample laminar flow that is greater than any side shear force at a boundary between the sample laminar flow and the first side wall or a boundary between the sample laminar flow and the second side wall to cause a disc face of the non-spherical biological entity to align parallel to the top and bottom laminar flows; and aligning the desired region with the depth of field in the field of view of the imaging device.

9. The method according to claim 8, wherein the rate of flow of the first viscoelastic fluid or the rate of flow of the second viscoelastic fluid in the flow chamber is controlled such that within the desired region of the flow chamber a distance between the bottom laminar flow and the top laminar flow is equal to or less than 10 microns.

10. The method according to claim 8, further comprising:

providing a first side viscoelastic fluid to the flow chamber such that the first side viscoelastic fluid laminarly flows in the flow chamber as a first side laminar flow sandwiched between the top laminar flow and the bottom laminar flow and between the first side wall and the sample laminar flow from the one end of the flow chamber towards the second end of the flow chamber;

providing a second side viscoelastic fluid to the flow chamber such that the second side viscoelastic fluid laminarly flows in the flow chamber as a second side laminar flow sandwiched between the top laminar flow and the bottom laminar flow and between the second side wall and the sample laminar flow from the one end of the flow chamber towards the second end of the flow chamber; and controlling a rate of flow of the first side viscoelastic fluid or a rate of flow of the second side viscoelastic fluid in the flow chamber.

11. The method according to claim 8, wherein the sample is blood.

12. The method according to claim 11, wherein the blood is undiluted.

13. The method according to claim 8, wherein the sample does not comprise any agent for rounding up of the non-spherical biological entity in the sample.

14. The method according to claim 8, wherein the non-spherical biological entity is erythrocyte.

15. The method according to claim 8, wherein the non-spherical biological entity is a platelet.

* * * * *